(12) United States Patent
Dahlke et al.

(10) Patent No.: US 12,145,331 B2
(45) Date of Patent: Nov. 19, 2024

(54) DISTRIBUTOR DEVICE, SYSTEM, AND METHOD FOR SEALING AND USING A METERING UNIT

(71) Applicant: Continental Reifen Deutschland GmbH, Hannover (DE)

(72) Inventors: Markus Dahlke, Wunstorf (DE); Florian Schlosser, Barsinghausen (DE); Raymond Becker, Doerentrup (DE); Andreas Bauhus, Neustadt (DE); Markus Gerlach, Gruenenplan (DE)

(73) Assignee: Continental Reifen Deutschland GmbH, Hannover (DE)

( * ) Notice: Subject to any disclaimer, the term of this patent is extended or adjusted under 35 U.S.C. 154(b) by 542 days.

(21) Appl. No.: 17/309,181

(22) PCT Filed: Oct. 1, 2019

(86) PCT No.: PCT/EP2019/076508
§ 371 (c)(1),
(2) Date: May 4, 2021

(87) PCT Pub. No.: WO2020/094299
PCT Pub. Date: May 14, 2020

(65) Prior Publication Data
US 2022/0024163 A1    Jan. 27, 2022

(30) Foreign Application Priority Data

Nov. 8, 2018 (DE) ..................... 10 2018 219 038.0

(51) Int. Cl.
*B29C 73/16* (2006.01)
*B29L 30/00* (2006.01)

(52) U.S. Cl.
CPC ......... *B29C 73/166* (2013.01); *B29L 2030/00* (2013.01)

(58) Field of Classification Search
CPC ..... B60C 23/10; B60C 11/03; B60C 11/0306; B60C 11/033; B60C 11/11;
(Continued)

(56) References Cited

U.S. PATENT DOCUMENTS 4,255,777 A * 3/1981 Kelly .................... B05B 5/1691
361/228
4,765,367 A 8/1988 Scott
(Continued)

FOREIGN PATENT DOCUMENTS

CN 101557922 A 10/2009
CN 104684772 A 6/2015
(Continued)

OTHER PUBLICATIONS

Chinese Office Action dated Jul. 29, 2022 of counterpart CN application 201980073737.7.
(Continued)

*Primary Examiner* — Timothy L Maust
*Assistant Examiner* — Christopher M Afful
(74) *Attorney, Agent, or Firm* — Gregory Adams; Richard Wolf

(57) ABSTRACT

The invention relates to a distributor device (1) for generating an aerosol (8) comprising both gas and sealant, wherein the distributor device has at least one gas connector (2) for connection to at least one compressed-air source (11), at least one sealant connector (3) for connection to at least one sealant container (12), and one or more than one connecting element (4) for connection to a pneumatic vehicle tire (16), characterized in that the distributor device has a metering unit (5) for metering the sealant quantity fed to the distributor device. The invention also relates to a system for sealing and inflating pneumatic vehicle tires, and to a method for sealing pneumatic vehicle tires or inflatable
(Continued)

technical articles, and to the use of a dosing unit for generating an aerosol.

19 Claims, 2 Drawing Sheets

(58) Field of Classification Search
CPC ............ B60C 11/1236; B60C 11/1307; B60C 2011/0365; B60C 2011/0372; B60C 2011/0376; B60C 11/00; B60C 19/00; B60C 3/00; B60C 3/04; B60C 99/006; B65D 25/20; B65D 1/0207; B65D 11/02; B65D 2565/385; B65D 43/162; B65D 5/00; B65D 65/38; B65D 65/466; B65D 85/84; B67D 7/74; G01F 1/3209; B29C 73/166; B05B 15/656; B05B 17/04; B05B 17/0646; B05B 17/0676; B05B 17/0684; B05B 7/0425; B05B 7/1686; B05B 7/2416; B05B 7/2427; B05B 7/2435; B01F 25/3142; B01F 25/431; B01F 25/433; B01F 25/4338; B01F 33/30; B01F 25/4317; B01F 25/431971; B01F 23/232; B01F 25/30; B05D 1/62; B05D 2252/02
USPC .......................................................... 141/38
See application file for complete search history.

(56) References Cited

U.S. PATENT DOCUMENTS

| | | | | |
|---|---|---|---|---|
| 5,074,244 A | * | 12/1991 | Byers | .................... B05B 7/0846 |
| | | | | 118/712 |
| 5,980,984 A | * | 11/1999 | Modera | ................. B05B 7/0075 |
| | | | | 427/236 |
| 6,032,836 A | | 3/2000 | Hiscocks et al. | |
| 2004/0076463 A1 | * | 4/2004 | Hall | ...................... A47L 13/312 |
| | | | | 401/138 |
| 2007/0181209 A1 | * | 8/2007 | Stehle | .................. B29C 73/166 |
| | | | | 141/38 |
| 2009/0107578 A1 | * | 4/2009 | Trachtenberg | ........ B05B 9/0805 |
| | | | | 141/38 |
| 2010/0108186 A1 | | 5/2010 | Yoshida et al. | |
| 2014/0099428 A1 | | 4/2014 | Paasch | |
| 2017/0326824 A1 | | 11/2017 | Bialach | |
| 2018/0272631 A1 | * | 9/2018 | Zaum | ...................... B60S 5/046 |
| 2018/0304564 A1 | | 10/2018 | Dowel | |
| 2019/0275756 A1 | | 9/2019 | Zaum et al. | |

FOREIGN PATENT DOCUMENTS

| | | | | |
|---|---|---|---|---|
| CN | 108367514 A | | 8/2018 | |
| CN | 108603067 A | | 9/2018 | |
| DE | 10314075 A1 | | 10/2004 | |
| DE | 102016209302 A1 | | 12/2017 | |
| EP | 1419876 A2 | | 5/2004 | |
| EP | 2090419 A1 | * | 8/2009 | .......... B29C 73/166 |
| JP | S5549162 A | | 4/1980 | |
| JP | H11503362 A | | 3/1999 | |
| JP | 2005279562 A | | 10/2005 | |
| JP | 2006188033 A | | 7/2006 | |
| JP | 2007000829 A | | 1/2007 | |
| JP | 2007112113 A | | 5/2007 | |
| JP | 2008183538 A | | 8/2008 | |
| JP | 2009137238 A | | 6/2009 | |
| JP | 2016531289 A | | 10/2016 | |
| WO | 2017207121 A1 | | 12/2017 | |

OTHER PUBLICATIONS

Japanese Notice of Allowance dated Sep. 30, 2022 of counterpart JP application 2021-517862.
International Search Report of International Application PCT/EP2019/076508 on which this application is based.
JP Opposition dated May 26, 2023 of counterpart Chinese application No. 2021-517862.

* cited by examiner

DISTRIBUTOR DEVICE, SYSTEM, AND METHOD FOR SEALING AND USING A METERING UNIT

Distributor device for generating an aerosol, system for sealing and inflating pneumatic vehicle tires and a method for sealing pneumatic vehicle tires or inflatable technical rubber articles and the use of a metering unit for generating an aerosol The invention relates to a distributor device for generating an aerosol comprising both gas and sealant, wherein the distributor device has at least one gas connector for connection to at least one compressed-air source, at least one sealant connector for connection to at least one sealant container, and one or more than one connecting element for connection to a pneumatic vehicle tire. The invention also relates to a system for sealing and inflating pneumatic vehicle tires, and to a method for sealing pneumatic vehicle tires or inflatable technical articles, and to the use of a metering unit for generating an aerosol.

In the case of tire-related breakdowns, there is generally the problem that—as has hitherto been conventional for example in a passenger motor vehicle—a spare tire filled with air and mounted on a wheel rim must be carried on-board, which then has to be exchanged for the punctured tire. The defective punctured tire must then be secured in the stowage space provided for the spare tire in the vehicle and later repaired. For this, it is often necessary to clear out a loaded vehicle in order to access the corresponding stowage space for the spare wheel, and to additionally also jack up the vehicle itself using jacks and carry out laborious repair work.

In order to avoid these disadvantages, repair kits or breakdown kits for the temporary repair of the tire have been known for a long time, which kits contain a compressor, a sealant, the corresponding connecting hoses and the necessary cable connections for the power supply as well as operator control elements, and thus constitute a permanently usable and complete repair kit as a substitute for the spare wheel.

In the case of such known breakdown kits, in the event of a tire-related breakdown, after the air compressor has been started, the sealant is conveyed from the corresponding sealant container into the damaged tire. In a second process step, the damaged tire is then filled with air up to a certain minimum pressure. In conventional systems, this refilling of the tire takes place counter to the outflow of air through the leak that is present in the tire. The leak can be sealed only after inflation of the punctured tire to a stable minimum pressure and subsequent onward travel using the inflated tire. For this reason, sealing of the tire leak without moving the tire in order to distribute the sealant in the tire has hitherto only very rarely been possible.

As already explained above, the onward travel and thus the tire movement can take place only when a certain minimum pressure has been established in the tire. Depending on the size of the leak in the tire, it is therefore possible that, in previous breakdown situations, sealing of the tire was not possible because the required minimum pressure was not attained. It is therefore desirable to be able to seal a tire with a leak in which a certain minimum pressure does not first have to be attained.

The following is already known in the prior art:

DE 102016209302 A1 discloses a "method for sealing and inflating inflatable articles, in particular for sealing and inflating motor vehicle tires, wherein, by means of a compressor which is driven preferably by means of an electric motor, a sealing and pumping pressure is generated, wherein, by means of the sealing and pumping pressure, via a valve and distributor device for sealant and compressed gas and via compressed-air and sealant hoses between valve and distributor device and an entry valve or an inlet nozzle of the inflatable article, a sealant situated in a sealant container connected to the valve and distributor device is conveyed into the inflatable article and, at the same time, the inflatable article is sealed and inflated to a predefined operating pressure" (see claim 1).

A problem addressed by the invention consists in providing a device which can at least partially seal a pneumatic vehicle tire or inflatable technical rubber article without the need to move the pneumatic vehicle tire or the inflatable technical rubber article and/or without a minimum pressure being present in a pneumatic vehicle tire or in an inflatable technical rubber article.

This problem is solved according to the invention by means of a distributor device for generating an aerosol comprising both gas and sealant, wherein the distributor device has

- at least one gas connector for connection to at least one compressed-air source,
- at least one sealant connector for connection to at least one sealant container,
- and
- one or more than one connecting element for connection to a pneumatic vehicle tire or to an inflatable technical rubber article,
- characterized in that
- the distributor device has a metering unit for metering the sealant quantity fed to the distributor device.

In the course of our own investigations, it has surprisingly been found that the leak of a tire can be at least partially sealed by virtue of an aerosol comprising both a gas, for example air, and sealant being introduced or forced into the tire with a leak. The leak in the tire gives rise to a flow of the aerosol from the introduction opening, at which the aerosol is introduced into the tire, to the leak in the tire, at which predominantly or exclusively the gas of the aerosol escapes. This introduction opening is usually located at the inner end of the tire valve.

Here, the sealant particles of the aerosol from a distributor device according to the invention stick to the walls of the leak and thus at least partially seal the leak. If a flow of the aerosol by means of the distributor device according to the invention to the leak of the tire lasts for a sufficient length of time, in particular if an aerosol yield of the sealant is sufficiently good, the leak of the tire can often

- be completely sealed or
- be sealed at least to such an extent that the required minimum pressure for onward travel using the partially sealed tire is attained.

This is advantageously achieved preferably without moving the tire itself. The onward travel subsequently has the effect that, upon launching, the sealant that remains in the tire is distributed, and the remaining leak in the tire can subsequently be completely or yet further sealed. In the context of the present invention, the pneumatic vehicle tire is preferably a pneumatic motor vehicle tire.

Surprisingly, in the course of our own investigations as described above or below, it has been found that an above aerosol can be produced only or in particular if the sealant quantity fed to the distributor device per unit of time is limited by means of precise metering.

The metering unit of a distributor device according to the invention is therefore particularly preferably a metering unit for limiting the sealant quantity fed to the sealant transport channel.

If too much sealant is fed to the distributor device at once, the aerosol yield is considerably reduced or, in the worst case, no more aerosol is formed. This can result in the sealant passing in the form of large, non-suspended sealant droplets into the punctured tire. This is disadvantageous for the following three reasons:
1. because, in this way, no leaks which are not at the lowest point of the punctured tire, the collecting point of the non-suspended droplets, can be sealed,
2. because the compressor has to be operated for a relatively long period of time in order to attain the minimum pressure and
3. because non-suspended sealant droplets are not suitable for sealing leaks in the side walls.

It is therefore necessary to meter the sealant quantity fed to the distributor device in order to ensure sufficient aerosol for sealing the pneumatic vehicle tire or the inflatable technical rubber article.

In the context of the present invention, the term "dispersion" describes a mixture of at least two substances in different phases, for example a solid-liquid or a solid-gaseous or a liquid-gaseous mixture. In the context of the present invention, the term "aerosol" describes a special dispersion in which a gas forms the continuous phase and the liquid in the form of aerosol particles forms the dispersed phase. In the context of the present invention, an aerosol is preferably a special dispersion in which a gas forms the continuous phase and the liquid in the form of aerosol particles forms the dispersed phase and at least one aerosol particle has a diameter of at most 100 µm, particularly preferably at least some of the aerosol particles have a diameter of at most 100 µm, very particularly preferably at least the majority of the number of aerosol particles have a diameter of at most 100 µm or 500 µm, all of the aerosol particles have a diameter of at most 100 µm or 500 µm. In the context of the present invention, an aerosol is particularly preferably a special dispersion in which a gas forms the continuous phase and the liquid in the form of aerosol particles forms a suspended dispersed phase and at least one aerosol particle has a diameter of at most 100 µm, particularly preferably at least some of the aerosol particles have a diameter of at most 100 µm, very particularly preferably at least the majority of the number of aerosol particles have a diameter of at most 100 µm, all of the aerosol particles have a diameter of at most 100 µm.

In the context of the present invention, the aerosol yield of the sealant is the ratio between the total mass of sealant particles of the generated aerosol to the total mass of sealant used. An aerosol yield of 100% therefore means that the entire mass of sealant has been converted into an aerosol.

As already mentioned above, it has been found in the context of the present invention that an aerosol as described above can be generated by virtue of the sealant quantity that is fed to a distributor device according to the invention being metered in a special way, that is to say not only the fed sealant quantity being controlled but also the sealant quantity being metered into the gas flow such that aerosol particles form from sealant droplets in the gas flow passing from the gas connector. Both the sealant quantity and the nature of the metered addition are achieved in the context of the present invention by means of the metering unit of the distributor device according to the invention.

In the context of the present invention, the gas of the aerosol is preferably a carrier gas which constitutes the continuous phase of the aerosol and which transports the aerosol particles. The carrier gas of the aerosol is for example compressed air from a compressor or some other compressed-air source. The terms "gas" and "carrier gas" are used synonymously in the context of this invention.

What is preferred as a distributor device according to the invention as described above or as described above as being preferred, wherein the distributor device has at least one sealant transport channel for transporting an aerosol from the metering unit to the one or more than one connecting element, and preferably the sealant transport channel spatially connects the gas connector to the sealant connector and to the one or more than one connecting element. The sealant transport channel may therefore preferably comprise one or more branching points and channel sections.

In the context of the present invention, the term "spatially connected/spatially connect" means that the various connectors or channel sections are oriented such that a compressed-air flow and/or a dispersion, preferably an aerosol composed of air and sealant, can pass from one channel section or connector to the other.

What is particularly preferred is a distributor device according to the invention as described above or as described above as being preferred, wherein the metering unit is designed such that the sealant fed to the distributor device can form aerosol particles in a gas flow passing from the gas connector, preferably such that the gas flow can be formed in the sealant transport channel.

The advantage of the above-described aspect of the present invention is that, when the above conditions of commonly used air flows from the compressor, commonly used sealant transport channels and commonly used sealant containers are adhered to, aerosol particles can be generated from sealant in the sealant transport channel of a distributor device according to the invention in a particularly effective manner.

What is preferred as a distributor device according to the invention as described above or as described above as being preferred, wherein the metering unit is arranged in or on the sealant connector or between the sealant connector and the sealant channel and/or the distributor device has a sealant transport channel for transporting an aerosol from the metering unit to the one or more than one connecting element. The metering unit is particularly preferably arranged at most 10 cm downstream of the sealant connector in the feed direction, very particularly preferably at most 5 cm downstream of the sealant connector in the feed direction, in particular very particularly preferably at most 2 cm downstream of the sealant connector in the feed direction.

In the context of the present invention, the sealant transport channel of a distributor device according to the invention has
 a length in the range from 10 mm to 10 000 mm, preferably in the range from 10 mm to 1000 mm, particularly preferably in the range from 10 mm to 600 mm,
and/or
 an inner diameter in the range from 0.1 mm to 100 mm, preferably in the range from 1 mm to 20 mm, particularly preferably in the range from 1 mm to 8 mm.

One advantage of the two aspects described above is that a particularly compact and space-saving arrangement of sealant connector, metering unit, gas connector and sealant transport channel can be achieved without the aerosol yield being impaired. A compact and space-saving configuration of the distributor device according to the invention has the advantage in particular that the aerosol particles formed cannot agglomerate or otherwise increase in size before they enter the tire with a leak.

What is preferred is a distributor device according to the invention as described above or as described above as being preferred, wherein the metering unit has at least one feed opening for feeding a sealant into the distributor device, preferably into the sealant transport channel, wherein, preferably, the one or the at least one feed opening has a diameter in the range from 0.01 mm to 10 mm, preferably a diameter in the range from 0.1 mm to 5 mm, particularly preferably a diameter in the range from 0.1 mm to 1.5 mm, very particularly preferably a diameter in the range from 0.1 mm to 1 mm.

One advantage of the aspect described above is that, with such feed openings, aerosol particles can be generated from sealant in the sealant transport channel in a particularly effective manner.

What is particularly preferred is a distributor device according to the invention as described above or as described above as being preferred, wherein the metering unit has at least one feed opening for feeding a sealant into the distributor device and the one feed opening has a diameter in the range from 0.1 mm to 5 mm, or preferably, the at least one feed opening has a diameter in the range from 0.1 mm to 1.5 mm and a number of feed openings lies in the range from 1 to 5 or 1 to 2, or particularly preferably, the at least one feed opening has a diameter in the range from 0.1 mm to 1 mm and a number of feed openings is at least 2 or lies in the range from 2 to 10, preferably in the range from 3 to 5.

In the context of the present invention, the feed openings may also have a non-circular shape and accordingly have a specific diagonal instead of a diameter. For example, if a feed opening has a polygonal shape, then the diameter is substituted by the diagonal of the square, of the pentagon, of the hexagon, etc. or by the height in the event that the shape of the feed opening of the metering unit is a triangle. If the feed openings have an asymmetrical shape, then the diameter or the diagonal is substituted by the distance between those points on the opening edge delimiting the feed opening which are furthest spaced apart.

One example in which the feed openings of the metering unit form asymmetrical shapes is for example when the metering unit of a distributor device according to the invention is an open-cell foamed plastic and the sealant is metered into the distributor device according to the invention through different channels of the open-cell foamed plastic. An advantage here is that, depending on the nature of the cell structure, a more uniform metering rate can be achieved during use when metering from a sealant container, since this can reduce the effect of gravitational force.

What is preferred is a distributor device according to the invention as described above or as described above as being preferred, wherein the dosing unit is designed such that an aerosol comprising sealant droplets and a gas is formed, preferably such that an aerosol comprising sealant droplets and a gas is formed in the sealant transport channel of the distributor device according to the invention, the number of feed openings and/or the diameter of the one or of the at least one feed opening can be adjusted, and/or the metering rate of the sealant quantity fed to the distributor device can be adjusted.

An advantage of the aspect described above is that, on the basis of the settings the number of feed openings, the diameter of the feed openings and/or the metering rate, the conditions can always be selected such that an aerosol comprising sealant droplets and a gas is formed. Since the volume flow of the sealant is usually defined by the remaining quantity of the sealant in the sealant container and the inner diameter D of the sealant transport channel can be varied only with difficulty during the operation of the device according to the invention, the size or the number of feed openings is a parameter which is relatively easy to control and which, with a decreasing sealant quantity in the sealant container, can be adapted such that an aerosol is preferably formed and the following formula (1) can particularly preferably be satisfied during the operation of the device according to the invention. This represents a long-awaited need in the present technical field.

The number and/or the diameter of the feed openings is preferably not only adapted to the metering rate, which is dependent on various parameters such as the fill level of the sealant container or the liquid properties of the sealant such as its viscosity. It is also advantageous if the number and/or the diameter of the feed openings is adapted to the volume flow from the compressed-air source in order to increase the aerosol yield. The adjustment of the number and/or the diameter of the feed openings can be performed more precisely and more abruptly than the adjustment of the compressed-air source.

For the reasons described above, what is therefore particularly preferred is a distributor device according to the invention wherein the metering unit is mounted in the distributor device such that the metering unit is above the sealant transport channel during the operation of the distributor device and/or additionally has a displaceable disk for opening and closing one or the at least one feed opening.

What is preferred is a distributor device according to the invention as described above or as described above as being preferred, wherein the one or the more than one connecting element comprises one, two or all of the following elements:

sealing element for air-tight connection between the connecting element and a tire valve, wherein the sealing element preferably has an auxiliary element for manually fastening of the connecting element to the tire valve, valve opening element for opening a tire valve and a discharge element for equalizing the internal wheel pressure with the external pressure.

In the context of the present invention, the internal wheel pressure is the pressure which is present in the wheel interior between the pneumatic vehicle tire and the vehicle wheel rim, and the external pressure which is present outside the vehicle pneumatic wheel, in particular outside the wheel interior.

In the following paragraph, formula (2) will be discussed first, before formula (1) is then described further below.

What is preferred is a distributor device according to the invention as described above or as described above as being preferred, wherein the metering unit is designed to satisfy the following condition or formula (2):

$$D_{mm} \cdot \sqrt[3]{a} \leq 10 \text{ mm}, \qquad \text{formula (2)}$$

which comprises the following parameters:

$D_{mm}$: diameter of the feed openings [mm] and a: number of feed openings.

It is therefore preferred if the formula (2) yields a value not only of ≤10 mm but of ≤1 mm, particularly preferably of ≤0.5 mm, very particularly preferably of ≤0.1 mm. In our own experiments, it has been found that, the smaller the left-hand side of the formula (2), the smaller the average diameter of the sealant droplets in the aerosol can be set to be.

It is a particularly great achievement of the present invention to have found that these two important parameters in the generation of the aerosol, the number and the diameter of the feed opening of the metering unit, must be set precisely as in formula (2) or as described above as being preferred.

What is preferred is a distributor device according to the invention as described above or as described above as being preferred, wherein the metering unit is suitable for satisfying the following condition or formula (3):

$$\frac{\rho_G \cdot \eta_{DM} \cdot v_G \cdot V_{DM}}{D \cdot \gamma_{DM} \cdot \sqrt[3]{a} \cdot \eta_G} \geq 10^{-9}, \qquad \text{formula (3)}$$

which comprises the following parameters:

$\rho_G$: density of air at 20° C. [kg/m³];

$v_{DM}$: dynamic viscosity of water at 20° C. [kg/(m·s)], measured at 20° C. by means of ASTM D7042 and Stabinger viscosimeter;

$V_{DM}$: volume flow between 1 000 000 and 100 000 000 m³/s, measured in accordance with ISO 1217, annex C;

$v_G$: flow speed of 0.000001 to 1 [m/s], measured in accordance with ASTM D3154-14;

D: diameter of the feed openings of 0.01 mm to 5 mm [m];

γDM: surface tension of water at 20° C. [kg/s²], measured in accordance with ASTM D1331-14 (method A), a: number of feed openings of 1 to 100;

$\eta_{DM}$: dynamic viscosity of the sealant at 20° C. [kg/(m·s)], measured in accordance with Brookfield DV-II+, spindle 1, 20° C.; and $\eta_G$: dynamic viscosity of air at 20° C. [kg/(m·s)], measured at 20° C. by means of Rankine viscosimeter at normal pressure in accordance with G. Meerlender, Rheologica Acta, (1965), 4, (1): pages 21-36.

The above-described distributor device according to the invention particularly preferably also comprises a sealant transport channel, wherein the inner diameter of the sealant transport channel is preferably measured at the first feed opening in the direction of the volume flow. What is particularly preferred here is a distributor device as described above as being preferred or as being particularly preferred, wherein the metering unit is suitable for generating an aerosol comprising both gas and sealant particles, or an aerosol composed of gas and sealant particles, in the sealant transport channel.

It is a great achievement of the present invention to have ascertained the above formulas (2) and (3) on the basis of our own investigations and considerations, and thus to be able to derive quantitative statements regarding the generation of an aerosol in the distributor device according to the invention.

One advantage of the aspect described above is that the aerosol yield can be better adjusted. The smaller the result of the formula (2) or the greater the result of the formula (3), the better the aerosol yield. In general, this means that the aerosol has smaller sealant droplets, that is to say sealant particles. In general, the sealant droplets in the aerosol are circular and therefore have a particle diameter.

In the context of the present invention, the terms "aerosol particles" and "aerosol droplets" are used synonymously; if the aerosol particles are composed of sealant, a "sealant particle", "sealant aerosol particle" or a "sealant droplet" is present.

In the context of the present invention, it is preferred if, in the formulae (1), (2) or (3) described above or below, $v_G \geq 10$ VDM/($\pi D^2$), particularly preferably if $v_G \geq 50$ VDM/($\pi D^2$), very particularly preferably if $v_G \geq 100$ VDM/($\pi D^2$), in particular very particularly preferably if $v_G = 500$ VDM/($\pi D^2$), particularly highly preferably if $v_G \geq 1000$ $V_{DM}$/($\pi D^2$).

It is therefore preferred if the formula (3) yields a value not only of greater than $10^{-9}$ but of greater than $10^{-8}$, particularly preferably of over $10^{-7}$, very particularly preferably of over $10^{-6}$. The greater the result on the left-hand side of the formula (3), the higher the aerosol yield. In general, this means that the average diameter of the sealant droplets in the aerosol is smaller.

It is a particularly great achievement of the present invention to have found that, in the generation of the aerosol, the viscosities of the sealant and the transport gas or of the compressed air influence the aerosol yield in the manner specified in formula (3).

What is particularly highly preferred is a distributor device as described above, wherein the distributor device has at least one gas connector for connection to at least one compressed-air source, at least one sealant connector for connection to at least one sealant container, and one or more than one connecting elements for connection to a pneumatic vehicle tire, wherein the distributor device has a metering unit for metering the sealant quantity fed to the distributor device, the metering unit is arranged in or on the sealant connector, the metering unit has two, three or four feed openings for feeding a sealant into the distributor device and the two, three or four feed openings have a diameter in the range from 0.1 mm to 1.5 mm or from 0.1 mm to 0.7 mm, the metering unit is designed such that the number of feed openings or the inner diameter of the one or of the at least one feed opening can be varied.

The above-described advantageous aspects of a distributor device according to the invention for generating an aerosol also apply to all aspects of a system described below, and the advantageous aspects of systems according to the invention as discussed below apply correspondingly to all aspects of a distributor device according to the invention for generating an aerosol.

The invention also relates to a system for sealing and inflating pneumatic vehicle tires, comprising a distributor device as described above or as described above as being preferred, at least one compressed-air source for generating a sealing pressure or a pump pressure and at least one sealant container for accommodating a sealant and/or a gas.

Here, system according to the invention can be configured such that sealant from the sealant container passes through the metering unit into the distributor device according to the invention owing to gravitational force and/or owing to the compressed air from the compressor. In the latter case, a system according to the invention preferably comprises a valve for controlling the compressed-air flow, wherein the valve is configured such that, in a bypass mode, it guides the compressed air directly into the tire to be sealed and, in a sealant mode, it conducts the compressed air at least partially firstly into the interior of the sealant container, preferably such that the compressed air is conveyed together with the sealant through the metering unit.

A system according to the invention preferably additionally comprises hoses and lines for connecting the individual system components, and also switching, control and display devices for easier operator control of the system.

What is preferred is a system according to the invention as described above or as described above as being preferred, wherein the system additionally comprises a temperature-control unit for cooling the sealant container.

What is particularly highly preferred is a system according to the invention as described above or as described above as being preferred, wherein the system has a distributor device as described above or as described above as being preferred, at least one compressed-air source for generating a sealing pressure or a pump pressure and at least one sealant container for accommodating a sealant and/or a gas, wherein the distributor device has a sealant transport channel, the metering unit is arranged in or on the sealant connector, the metering unit is designed to satisfy the following condition or formula (2):

$$D_{mm} \cdot \sqrt[3]{a} \le 10 \text{ mm,} \qquad \text{formula (2)}$$

which comprises the following parameters:

$D_{mm}$: diameter of the feed openings [mm]

and a: number of feed openings.

The above-described advantageous aspects of a distributor device according to the invention and systems according to the invention also apply to all aspects of the use of a metering unit as described below, and the advantageous aspects of inventive uses of a metering unit as discussed below apply accordingly to all aspects of a distributor device according to the invention and systems according to the invention.

The invention also relates to the use of a metering unit as described above or as described above as being preferred or of a distributor device as described above or as described above as being preferred for generating an aerosol comprising sealant droplets and gas, wherein the generated aerosol is preferably conducted into a pneumatic vehicle tire or into an inflatable technical rubber article, and/or for generating an aerosol for sealing pneumatic vehicle tires or inflatable technical rubber articles, wherein the generated aerosol is preferably conducted into a pneumatic vehicle tire or into an inflatable technical rubber article.

The advantageous aspects of a distributor device according to the invention, systems according to the invention and uses according to the invention as discussed above also apply to all aspects of a method described below, and the advantageous aspects of methods according to the invention as discussed below apply accordingly to all aspects of a distributor device according to the invention, systems according to the invention and uses according to the invention.

The invention also relates to a method for sealing pneumatic vehicle tires or inflatable technical rubber articles, comprising the following steps:

A) providing or producing a system as described above or as described above as being preferred, a sealant in the sealant container and a pneumatic vehicle tire with a leak or an inflatable technical rubber article with a leak, B) conducting the sealant and a gas, for example compressed air, through the distributor device of the system into the pneumatic vehicle tire with a leak or into the inflatable technical rubber article with a leak, C) at least partially sealing the pneumatic vehicle tire with a leak or the inflatable technical rubber article with a leak.

A method according to the invention has the advantages described above, wherein it should be mentioned in particular that, in a method according to the invention, a tire with a leak does not have to be caused to roll in order to partially or completely seal the leak. This results from the generation of an aerosol in the interior of the tire with a leak, which leads to at least partial sealing of the pneumatic vehicle tire according to step C).

Preferably, the sealant is composed of, or the sealant of a method according to the invention comprises, water and at least one sealing substance based on rubber or resin, wherein polyisoprene is preferred as rubber or rosin resin is preferred as resin, wherein the water content of the sealant preferably makes up at least 80 wt % of the total weight of the sealant, particularly preferably at least 90 wt %, very particularly preferably at least 99 wt %.

What is preferred is a method as described above or as described above as being preferred, wherein the pneumatic vehicle tire or the inflatable technical rubber article is not moved, in particular is not rotated, during step C) and/or in the time between steps B) and C).

What is preferred is a method as described above or as described above as being preferred, wherein, in step B), an aerosol composed of sealant droplets and the gas is generated by feeding the sealant into the sealant transport channel by means of the metering unit.

What is preferred is a method as described above or as described above as being preferred, wherein the method additionally comprises the following step, wherein the step B-C) is carried out at a time before step C):

B-C) conducting the aerosol from the metering unit of the distributor device via the or a sealant transport channel into the motor vehicle tire with a leak or into the inflatable technical rubber article with a leak, wherein the aerosol is preferably as described above or below.

One advantage of the aspect described above is that a sealant transport channel for transporting an aerosol prevents a disadvantageous conglomeration of the aerosol particles or a disadvantageous coalescence thereof and thus ensures that the greatest possible proportion of the aerosol particles passes as far as possible unchanged into the tire with a leak or into the inflatable technical rubber article with a leak. A sealant transport channel of a distributor device according to the invention may for example be composed of commercially available polypropylene and comprise a commercially available tire connector, which constitutes the sealant transport channel with a tire valve, or may comprise a facility for connection to an inflatable technical rubber article. Instead of polypropylene, use may be made of any commercially available plastic on the surface of which water has a contact angle of over 90°, measured in accordance with ASTM D7334-08 (2013). The above-described sealant transport channel for transporting an aerosol is in particular a sealant transport channel of a distributor device according to the invention as described above or as described above as being preferred.

What is preferred is a method as described above or as described above as being preferred, wherein, in step B), an aerosol composed of sealant droplets and the gas is generated by feeding the sealant into the sealant transport channel by means of the metering unit, and/or at least 50 wt % of the aerosol particles of the aerosol conducted in step B) into the pneumatic vehicle tire with a leak or into the inflatable technical rubber article with a leak have a particle diameter in the range from 0.01 μm to 500 μm, preferably in the range from 1 μm to 100 μm.

In the context of the present invention, the diameter of the aerosol particles or the average particle diameter of the aerosol particles is preferably measured using a known optical particle counter, particularly preferably using the "GRIMM wide-range system" from the company "Grimm Aerosol Technik GmbH". The average particle diameter is very particularly preferably the numerical average of the various particle diameters of the aerosol particles.

An advantage of the aspect described above is that aerosol particles as described above or as described previously achieve that
    a pneumatic vehicle tire or an inflatable technical rubber article is sealed particularly effectively,
and/or
    a particularly large proportion of the aerosol can be transported to the leak, which is advantageous in particular when using a tire connector, because aerosol particle size distributions as described above pass through this particularly effectively.

What is very particularly preferred as a method as described above or as described above as being preferred, wherein the aerosol particles
    have an average particle diameter of the aerosol particles in the range from 50 to 150 μm, wherein the particle diameter of the aerosol particles is no greater than 9000 μm, preferably no greater than 5000 μm, particularly preferably no greater than 500 μm, very particularly preferably no greater than 100 μm,
    particularly preferably have an average particle diameter of the aerosol particles in the range from 50 to 100 μm, wherein the particle diameter of the aerosol particles is no greater than 5000 μm, preferably no greater than 1000 μm, particularly preferably no greater than 500 μm, very particularly preferably no greater than 100 μm.

What is also very particularly preferred is a method as described above or as described above as being preferred or as described above as being particularly preferred, wherein the aerosol particles have an average particle diameter of the aerosol particles in the range from 50 to 150 μm and
    at least 50 percent by mass of the aerosol particles, preferably at least 90 percent by mass, have a particle diameter of the aerosol particles in the range from 1 μm to 100 μm.

What is preferred is a method as described above or as described above as being preferred, wherein the following condition or formula (1) is satisfied:

$$\frac{\rho_G \cdot v_G \cdot V_{DM}}{D \cdot \gamma_{DM} \cdot \sqrt[3]{a}} \geq 10^{-5}, \quad \text{formula (1)}$$

which comprises the following parameters:
    $\rho_G$: density of the transport gas at 20° C. [kg/m³];
    $v_G$: flow speed of the gas or compressed-air quantity fed to the distributor device [m/s], measured in accordance with ASTM D3154-14;
    $V_{DM}$: volume flow of the sealant quantity fed to the distributor device [m³/s], measured in accordance with ISO 1217, annex C;
    D: diameter of the feed openings [m];
    $\gamma_{DM}$: surface tension of the sealant at 20° C. and normal pressure [kg/s²], measured in accordance with ASTM D1331-14 (method A),
    and
    a: number of feed openings.

It is therefore preferred if the formula (1) yields a value not only of greater than $10^{-4}$ but of greater than $10^{-3}$, particularly preferably of over $10^{-2}$, very particularly preferably of over $10^{-1}$, in particular very particularly preferably of over 1, particularly highly preferably of over 10. The greater the result on the left-hand side of the formula (1), the higher the aerosol yield. In general, this means that the average diameter of the sealant droplets in the aerosol is smaller.

It is a particularly great achievement of the present invention to have found that, in the generation of the aerosol, the surface tension of the sealant influences the aerosol yield in the manner specified in formula (1).

What is preferred is a method as described above or as described above as being preferred, wherein the following condition or formula (3) is satisfied:

$$\frac{\rho_G \cdot \eta_{DM} \cdot v_G \cdot V_{DM}}{D \cdot \gamma_{DM} \cdot \sqrt[3]{a} \cdot \eta_G} \geq 10^{-9}, \quad \text{formula (3)}$$

which comprises the following parameters:
    $\rho_G$: density of the transport gas at 20° C. [kg/m³];
    $\eta_{DM}$: dynamic viscosity of the sealant at 20° C. [kg/(m·s)], measured at 20° C. by means of ASTM D7042 and Stabinger viscosimeter;
    $v_G$: flow speed of the gas or compressed-air quantity fed to the distributor device [m/s], measured in accordance with ASTM D3154-14;

$V_{DM}$: volume flow of the sealant quantity fed to the distributor device [m³/s], measured in accordance with ISO 1217, annex C;

D: diameter of the feed openings [m];

$\gamma_{DM}$: surface tension of the sealant at 20° C. and normal pressure [kg/s²], measured in accordance with ASTM D1331-14 (method A), a: number of feed openings;

and $\eta_G$: dynamic viscosity of the transport gas at 20° C. [kg/(m·s)], measured at 20° C. by means of Rankine viscosimeter at normal pressure in accordance with G. Meerlender, Rheologica Acta, (1965), 4, (1): pages 21-36.

What has been stated above applies to formula (3).

What is preferred is a method as described above or as described above as being preferred, wherein the mass flow of the sealant of the aerosol
  in the sealant transport channel and/or, preferably and, into the pneumatic vehicle tire and/or, preferably and, into the inflatable technical rubber article
  is at least partially in the range from 0.001 g/s to 10 g/s in relation to the total weight of the sealant, particularly preferably in the range from 0.1 g/s to 1.5 g/s, wherein, preferably, the mass flow of the sealant of the aerosol in the sealant transport channel during step B-C) is in the range from 0.001 g/s to 10 g/s in relation to the total weight of the sealant, particularly preferably from 0.01 g/s to 1.5 g/s.

One advantage of the above-described aspect is that, in the above-described ranges of the mass flow of the sealant, pneumatic vehicle tires or inflatable technical rubber articles can be sealed particularly effectively. The reason for this is often that there is a particularly good aerosol yield in these mass flow ranges. This applies in particular if the sealant transport channel is followed by a tire connector, because the above-described mass flow gives rise to the above-described advantageous aerosol particle size distributions.

What is preferred is a method as described above or as described above as being preferred, wherein the volume flow of the aerosol into the pneumatic vehicle tire or into the inflatable technical rubber article is in the range from 0.00001 l/s to 0.1 l/s in relation to the total volume of the aerosol, particularly preferably in the range from 0.0001 l/s to 0.01 l/s, or wherein the flow speed of the aerosol in the sealant transport channel during step B-C) is at least partially in the range from 1 m/s to 100 m/s, particularly preferably in the range from 10 m/s to 50 m/s.

One advantage of the above-described aspect is that, in the above-described ranges of the mass flow of the compressed air or of some other carrier gas, pneumatic vehicle tires or inflatable technical rubber articles can be sealed particularly effectively. The reason for this is often that there is a particularly good aerosol yield in these volume flow ranges. This applies in particular if the sealant transport channel is followed by a tire connector, because the above-described volume flow, in particular in combination with the above-described mass flows, gives rise to the above-described advantageous aerosol particle size distributions.

What is preferred is a method as described above or as described above as being preferred, wherein the aerosol is generated in step B) by means of the metering unit by feeding the sealant into a or into the gas flow of the carrier gas in the sealant transport channel. The carrier gas is preferably compressed air from a compressor or some other compressed-air source.

What is preferred is a method as described above or as described above as being preferred, wherein, during step C), the sealing pressure in the pneumatic vehicle tire is at least partially in the range from 0.5 bar to 3 bar and/or the hydrodynamic pressure of the volume flow of the aerosol in the sealant transport channel is at least partially in the range from 0.2 bar to 8 bar.

In the context of the present invention, the sealing pressure in the pneumatic vehicle tire is the pressure that can be measured using a commercially available manometer while the aerosol is flowing into the pneumatic vehicle tire with a leak.

One advantage of the above-described aspect is that, in the above-described pressure ranges, the sealing in a tire or in an inflatable technical rubber article is particularly effective. The reason for this is often that there is a particularly good aerosol yield in these pressure ranges. This applies in particular if the sealant transport channel is followed by a tire connector, because the above-described pressure ranges give rise to the above-described advantageous aerosol particle size distributions.

What is particularly preferred is a method as described above, comprising the following steps:

A) providing or producing
  a system as described above or as described above as being preferred,
  a sealant in the sealant container
  and
  a pneumatic vehicle tire with a leak or an inflatable technical rubber article with a leak, B) conducting the sealant and a gas such as compressed air through the distributor device of the system into the pneumatic vehicle tire with a leak or into the inflatable technical rubber article with a leak, B-C) conducting the aerosol from the sealant transport channel of the distributor device into a pneumatic vehicle tire with a leak, C) at least partially sealing the pneumatic vehicle tire with a leak or the inflatable technical rubber article with a leak, wherein, in step B), an aerosol composed of sealant droplets and the gas is generated by feeding the sealant into the sealant transport channel by means of the metering unit, the pneumatic vehicle tire or the inflatable technical rubber article is not moved, in particular is not rotated, during step C) and/or in the time between steps B) and C), at least 50 wt % of the sealant droplets of the aerosol generated in step B) have a particle diameter in the range from 1 μm to 100 μm, the mass flow of the sealant of the aerosol into the pneumatic vehicle tire is in the range from 0.01 g/s to 10 g/s in relation to the total weight of the sealant, and the volume flow of the aerosol into the pneumatic vehicle tire is in the range from 0.01 l/s to 1.5 l/s in relation to the total volume of the aerosol, and, during step C), the sealing pressure in the vehicle tire is in the range from 0.2 bar to 8 bar.

DESCRIPTION OF THE FIGURES

In the figures:

FIG. 1 shows, in a top view, a schematic illustration of a distributor device 1 according to the invention in a first embodiment, wherein the cross-sectional plane runs parallel to the transport direction 20 of the aerosol 8 in the sealant transport channel 6 and perpendicular to the feed direction 23 of the sealant. The distributor device 1 according to the invention has a gas connector 2, a sealant connector 3 and a tire connector 4 and also a sealant transport channel 6. The sealant connector 3 is illustrated schematically in a top view and is ring-shaped in order that a sealant container (not illustrated) can be screwed onto the sealant connector 3 such that the opening of the sealant container is situated above the metering unit 5 with the feed opening 7. The distributor device 1 illustrated in FIG. 1 does not comprise an opening unit for opening a sealant container, such that a sealant container (not illustrated) would, before being fastened to the sealant connector 3, have to be opened such that the sealant can flow or be fed from the sealant container into the distributor device 1.

FIG. 2 is a schematic illustration of a cross-sectional view of a distributor device 1 according to the invention in a further embodiment, wherein the cross-sectional plane runs along the section A-A as shown in FIG. 1. The distributor device 1 according to the invention has a gas connector 2, a sealant connector 3 and a tire connector (not illustrated in FIG. 2) and also a sealant transport channel 6 with an inner diameter 14. In FIG. 2, an only partially illustrated sealant container 12 has been screwed onto the sealant connector 3, wherein the sealant container 12 comprises sealant 21 and a protective foil 23. In the embodiment of the present invention illustrated in FIG. 2, the sealant container 12 is screwed onto the distributor device according to the invention, wherein the protective film 23 is pierced by the opening unit 17 such that sealant 21 can pass from the sealant container 12 to the metering unit 5 of the distributor device 1 under the action of gravitational force. In the embodiment illustrated in FIG. 2, the sealant 21 is fed to the sealant transport channel 6 in the feed direction 32 with the aid of gravitational force and is subsequently atomized by the compressed air 10. Here, the inner diameter 15 of the feed opening 7 ensures that the sealant quantity fed to the sealant transport channel 6 is set such that an aerosol 8 is formed in the sealant transport channel 6. Here, the aerosol 8 is composed of aerosol particles 9 and the compressed air 10 as carrier gas, and is transported in the transport direction 20 via the tire connector (not illustrated) to the pneumatic vehicle tire (likewise not illustrated). In a further embodiment according to the invention, it is also possible for the compressed air 10 to be conducted at least partially into the sealant container 12 in order to thus feed even greater quantities of sealant per unit of time into the distributor device 1 according to the invention.

FIG. 3 is a schematic illustration of a system 15 according to the invention in one embodiment. Here, the system 15 according to the invention comprises a compressor 11 as compressed-air source, which guides compressed air 10 to the distributor device 1 according to the invention, and the distributor device 1 according to the invention itself and also a sealant container 12. In FIG. 3, it is schematically illustrated that the compressed air 10 is conducted through a compressed-air channel 25 from the compressor 11 to the distributor device 1 according to the invention and, there, impinges on the sealant 21, which changes into an aerosol 8 with aerosol particles 9 owing to the precisely set metering unit 5. The aerosol 8 is then guided in the sealant transport channel 6 in the transport direction 20 via the tire connector 4 and via the tire valve 18 into the interior of the pneumatic vehicle tire 16. Having arrived in the interior of the pneumatic vehicle tire 16, the aerosol generates a sealing pressure in the pneumatic vehicle tire 16 and in so doing displaces previously present air through the leak 24. This process continues until the aerosol 8 starts to leak out. Owing to the changes in flow at the leak 24, a proportion of the aerosol 8 then settles on the surface of the leak 24 and thus at least partially seals the leak 24. Depending on how much aerosol 8 reaches the leak 24, this process may under some circumstances even continue until the leak 24 is completely sealed with sealant 21 that has passed to the leak 24 by way of the aerosol 8.

EXPERIMENTAL EXAMPLES

Figure 1:
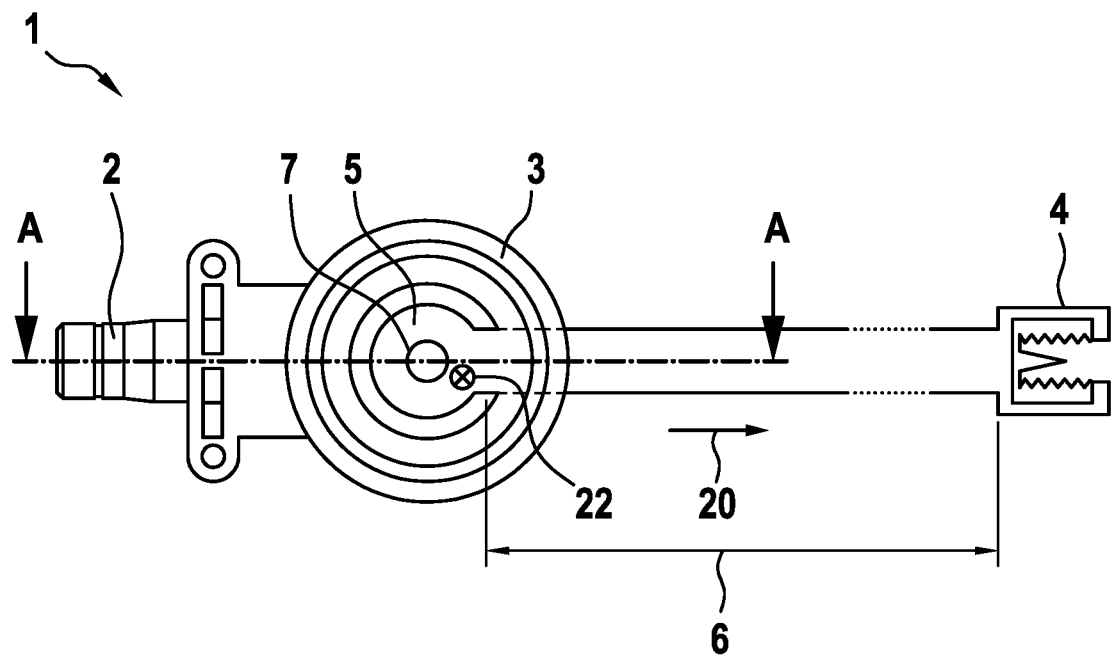
FIG. 1: shows a top view of a schematically illustrated distributor device according to the invention, wherein the image plane runs parallel to the transport direction of the aerosol in the sealant transport channel and perpendicular to the feed direction of the sealant through the metering unit.

Test procedure to determine the aerosol yield:

The following objects were used to determine the aerosol yield of a distributor device not according to the invention and of a distributor device according to the invention:

- breakdown kits with the product name "ContiMobilityKit" from the company Continental as an example of a system according to the invention,
- cylindrical collecting containers with a cylinder height of 23 cm and with an opening at the upper end of the cylindrical collecting container of 9 cm,
- various metering units, which differ in terms of the number and/or in terms of the diameter of the feed openings,
- a conventional tire valve without tire, and
- a stand for holding the "tire connector" of the breakdown kit.

The test procedure of the comparative test will be described below. The tests according to the invention with distribution devices according to the invention were carried out accordingly, wherein, by contrast to the comparative test, the respective distribution devices had a respective one of the dosing units specified in table 1.

The conventional tire valve was connected to the "tire connector" of the breakdown kit as an example of a connecting element for connection to a pneumatic vehicle tire, and, with the aid of the stand, was positioned above the cylindrical collecting container such that the end of the tire valve not connected to the tire connector was situated centrally above the opening of the upper end of the cylindrical collecting container and pointed in the direction of the opening of the upper end of the cylindrical collecting container. The distance between the opening of the upper end of the cylindrical collecting container and the end of the tire valve not connected to the tire connector corresponded to approximately 10 cm.

The compressor of the breakdown kit was then started with a pump pressure of 4 bar and a compressed-air flow with a flow speed of approx. 29 m/s, and a sealant container which had a maximum volume of 500 ml was filled with 367 g of conventional sealant (sealant "AP1" from Continental AG). The filled sealant container was then screwed onto the sealant connector of the distributor device of the breakdown kit such that the 376 g of conventional sealant was transported through the sealant transport channel, through the tire connector and through the tire valve into the collection container. Upon exiting the tire valve, a mixture of sealant droplets of different sizes formed, which was sprayed in the direction of the collecting container owing to the compressed air from the compressor of the breakdown kit. If these sealant droplets were small enough to form an aerosol, such sealant droplets were not forced into the collection container. Instead, the sealant droplets atomized from the tire valve were forced outward and thus missed the collecting container. The remaining sealant droplets with a relatively large diameter were caught in the collecting container because they were too heavy. After all of 376 grams of conventional sealant had been conducted through the tire valve, the weight of the sealant droplets caught in the sealant container was measured.

In very general terms, it can be said that the greater the sealant quantity collected in the collecting container, the less aerosol was obtained from the initial 376 g of conventional sealant, that is to say the poorer the aerosol yield.

The test procedure described above was carried out correspondingly for the tests according to the invention with the distributor devices according to the invention. In this way, an aerosol yield was determined for the distributor device of the breakdown kit without a metering unit (not according to the invention) and for each distributor device according to the invention of the breakdown kit with a metering unit (see table 1 below).

Here, the aerosol yield AB), was calculated as follows:

$$AB_x = 1 - \frac{m_{auffang,x}}{367\ g} \quad \text{formula (A)}$$

wherein the index x may be either VV (comparative test), E1, E2 or E3 (tests according to the invention)

and $m_{auffang,x}$=the mass [g] of the sealant collected in the collecting container during the respective test (VV, E1, E2 or E3).

Here, the improvement in the aerosol yield $V_{AB,x}$ (in percent) was calculated as follows:

$$V_{AB,x} = 100 \cdot \left(\frac{AB_x}{AB_{VV}} - 1\right) \quad \text{formula (B)}$$

wherein the index x may in this case be VV (comparative test), E1, E2 or E3 (tests according to the invention).

Results:

TABLE 1

Experimental data of devices according to the invention and devices not according to the invention

| Test designation | Comparative test VV | Test E1 according to the invention | Test E1 according to the invention | Test E1 according to the invention |
|---|---|---|---|---|
| Distributor device used comprises a metering unit | No | Yes | Yes | Yes |
| $\rho_G$ [kg/m$^3$] | 1.2 | 1.2 | 1.2 | 1.2 |
| $\eta_{DM}$ [kg/(m · s)] | 0.001 | 0.001 | 0.001 | 0.001 |
| $v_G$ [m/s] | 29 | 29 | 29 | 29 |
| $\gamma_{DM}$ [kg/s$^2$] | 75 | 75 | 75 | 75 |
| $\eta_G$ [kg/(m · s)] | 18.2 | 18.2 | 18.2 | 18.2 |
| Number of feed openings in the metering unit* | (no metering unit present) | 2 | 1 | 4 |
| Diameter of the feed opening (m) | — | 0.001 | 0.001 | 0.0005 |
| Improvement $V_{AB}$ | 0% | 75% | 141% | 682% |

*The volume flow $V_{DM}$ of the fed sealant quantity was, in the tests according to the invention, approximately 10$^{-6}$ m$^3$/s and, in the comparative test VV, approximately 10$^{-5}$ m$^3$/s.

It can be seen from table 1 that the use of a metering unit in a distributor device according to the invention, as was used in the tests E1, E2 and E3, makes it possible to attain a significant improvement $V_{AB}$ in the aerosol yield. A particularly great improvement $V_{AB}$ in the aerosol yield (682%) in relation to a distributor device without a metering unit as known in the prior art was attained in the test E3. Here, a distributor device according to the invention comprising a metering unit which had four feed openings, each with a diameter of 0.5 mm, was used.

Comparing the test E1 with the test E2, it can be seen that, with a lower metering rate in test E2, which results from the smaller number of feed openings, it was possible to attain an improvement $V_{AB}$ in the aerosol yield of 75% to 141%. Corresponding observations can be made in the case of an equal number of feed openings but smaller diameters.

In the tests E1 and E3, the product of the number of feed openings and the diameter of the feed openings was kept constant in order to investigate the influence of the variation of the diameter of the feed openings in the case of a potentially constant metering rate. Comparing the tests E1 and E3, it can thus be seen that, despite the same area of feed openings, it was possible to attain a significant improvement $V_{AB}$ in the aerosol yield in the test E3. It can thus be seen from the comparison of the tests E1 and E3 that, with the aid of metering units with feed openings with a diameter of smaller than 1 mm, sealant can be converted into an aerosol more effectively.

LIST OF REFERENCE DESIGNATIONS

Figure 2:
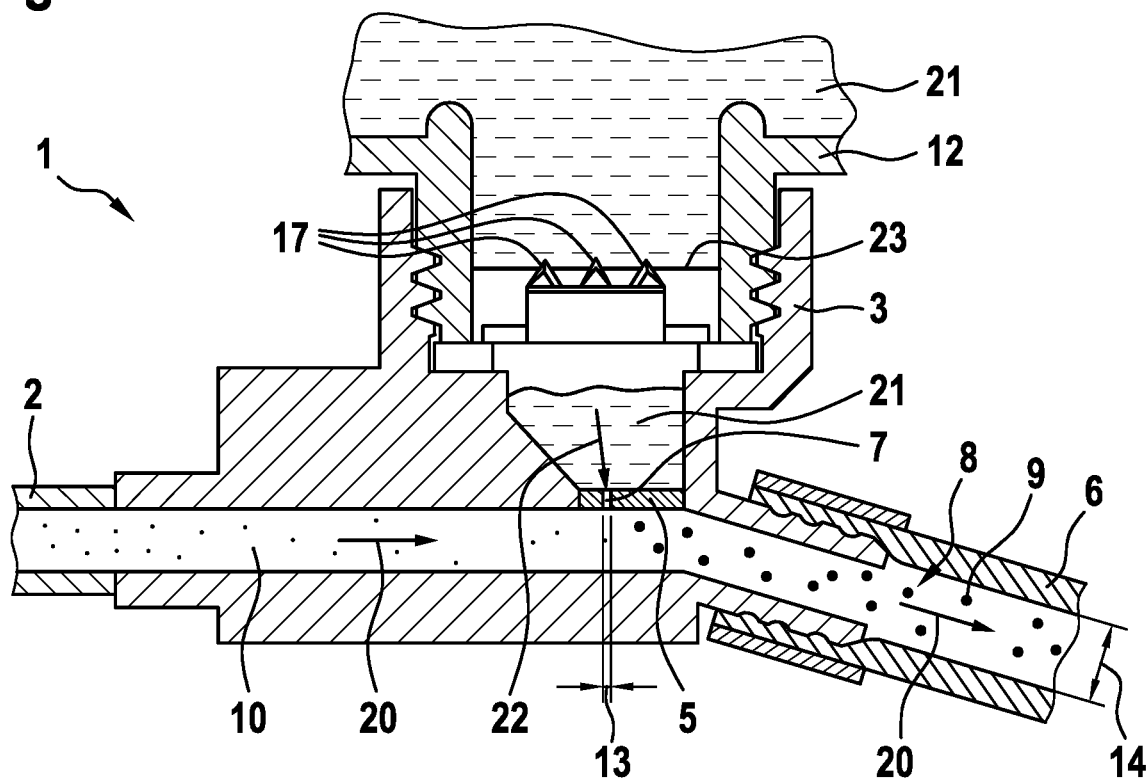
FIG. 2: shows a cross-sectional view of a schematically illustrated distributor device according to the invention, wherein the cross-sectional plane runs along the section A-A as shown in FIG. 1.
Figure 3:
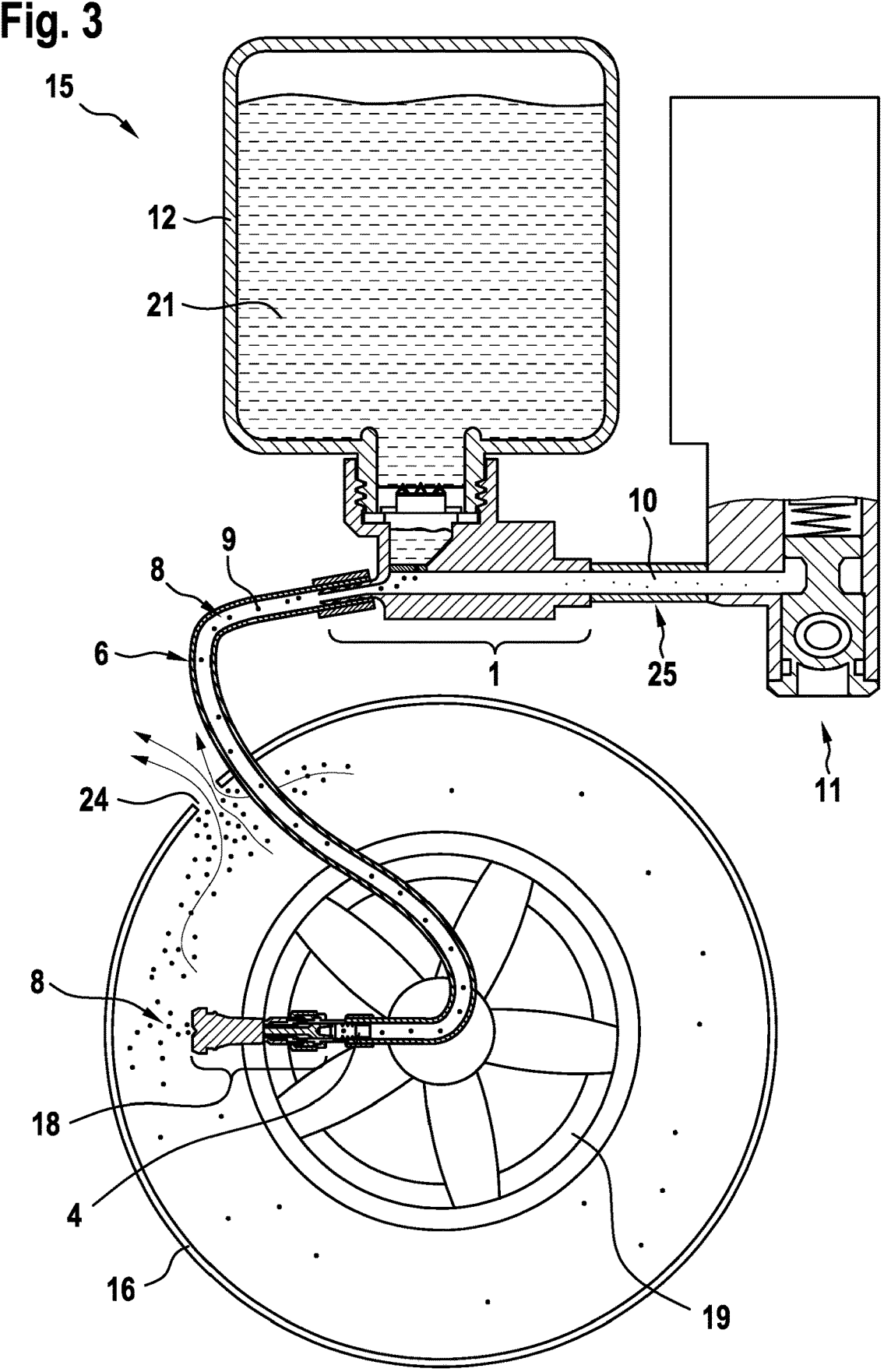
FIG. 3: shows a schematic overview of a system according to the invention connected to a pneumatic vehicle tire via a tire valve.

1 Distributor device according to the invention
2 Gas connector
3 Sealant connector
4 Connecting element; tire connector
5 Metering unit
6 Sealant transport channel
7 Feed opening
8 Aerosol 9 Aerosol particle; aerosol droplet; sealant droplet; sealant particle
10 Gas; transport gas; compressed air
11 Compressed-air source; compressor
12 Sealant container
13 Diameter of the feed opening
14 Inner diameter D of the sealant transport channel
15 System according to the invention for sealing and inflating pneumatic vehicle tires
16 Pneumatic vehicle tire with a leak; inflatable technical rubber article with a leak
17 Opening unit for opening the sealant container
18 Tire valve
19 Rim
20 Transport direction of the aerosol
21 Sealant
22 Feed direction of the sealant through the metering unit
23 Protective foil; aluminium foil
24 Leak
25 Compressed-air channel
A-A Section plane from FIG. 1 for FIG. 2

The invention claimed is:

1. A distributor device for generating an aerosol comprising both gas and sealant, wherein the distributor device comprises:
at least one gas connector for connection to at least one compressed-air source;
at least one sealant connector for connection to at least one sealant container;
and,
a connecting element for connection to a pneumatic vehicle tire or to an inflatable technical rubber article;
wherein the distributor device has a meter for metering the sealant quantity fed to the distributor device;
wherein the following formula (1) is satisfied:

$$\frac{\rho_G \cdot v_G \cdot V_{DM}}{D \cdot \gamma_{DM} \cdot \sqrt[3]{a}} \geq 10^{-5}, \tag{1}$$

which comprises the following parameters:
$\rho_G$ is density of the transport gas at 20° C. [kg/m³];
$v_G$ is flow speed of the gas or compressed-air quantity fed to the distributor device [m/s], measured in accordance with ASTM D3154-14;
$V_{DM}$ is volume flow of the sealant quantity fed to the distributor device [m³/s], measured in accordance with ISO 1217, annex C;
D is diameter of the feed openings [m];
$\gamma_{DM}$ is surface tension of the sealant at 20° C. and normal pressure [kg/s²] measured in accordance with ASTM D1331-14 (method A); and,
a is the number of feed openings.

2. The distributor device as claimed in claim 1, wherein the meter has a feed for feeding a sealant into the distributor device, and the feed has a diameter in the range from 0.01 mm to 10 mm.

3. The distributor device as claimed in claim 2, wherein the feed has a diameter in the range from 0.1 mm to 5 mm.

4. The distributor device as claimed in claim 3, wherein the feed has a diameter in the range from 0.1 mm to 1.5 mm.

5. The distributor device as claimed in claim 4, wherein the feed has a diameter in the range from 0.1 mm to 1 mm.

6. The distributor device as claimed in claim 2, wherein the meter satisfies the following formula (2):

$$D_{mm} \cdot \sqrt[3]{a} \leq 10 \text{ mm}, \tag{2}$$

which comprises the following parameters:
$D_{mm}$ is the diameter of the feed openings [mm]; and,
a is the number of feed openings.

7. The distributor device as claimed in claim 2, wherein the meter is designed such that a number of feed openings and/or the diameter of the feed opening can be varied;
wherein an aerosol comprising sealant droplets and a gas is formed in the sealant transport channel of the distributor device; and,
wherein the metering rate of the sealant quantity fed to the distributor device can be adjusted.

8. The distributor device as claimed in claim 2, wherein the meter is designed such that the number of feed openings and/or the diameter of the at least one feed opening can be varied;
wherein an aerosol comprising sealant droplets and a gas is formed; and,
wherein the metering rate of the sealant quantity fed to the distributor device can be adjusted.

9. The distributor device as claimed in claim 1, wherein the meter is arranged in or on the sealant connector and the distributor device has a sealant transport channel for transporting an aerosol from the metering unit to the one or more than one connecting element.

10. The device of claim 1, wherein the distributor device generates an aerosol comprising sealant droplets and gas, wherein the generated aerosol is conducted into a pneumatic vehicle tire or into an inflatable technical rubber article.

11. The device of claim 1, wherein the generated aerosol is conducted into a pneumatic vehicle tire or into an inflatable technical rubber article.

12. A system for sealing and inflating pneumatic vehicle tires, comprising the distributor device as claimed in claim 1, at least one compressed-air source for generating a sealing pressure or a pump pressure, and at least one sealant container for accommodating a sealant.

13. A system for sealing and inflating pneumatic vehicle tires, comprising the distributor device as claimed in claim 1, at least one compressed-air source for generating a sealing pressure or a pump pressure, and at least one sealant container for accommodating a gas.

14. A system for sealing and inflating pneumatic vehicle tires, comprising the distributor device as claimed in claim 1, at least one compressed-air source for generating a sealing pressure or a pump pressure, and at least one sealant container for accommodating a sealant and a gas.

15. A method for sealing pneumatic vehicle tires or inflatable technical rubber articles, comprising:
providing a system for sealing having a distributor device, a compressed-air source and a sealant container for accommodating a sealant and a gas:
A) providing or producing:
a sealant in the sealant container; and,
a pneumatic vehicle tire with a leak or an inflatable technical rubber article with a leak;
B) conducting the sealant and a gas through the distributor device of the system (15) into the pneumatic vehicle tire with a leak or into the inflatable technical rubber article with a leak; and,
C) at least partially sealing the pneumatic vehicle tire with a leak or the inflatable technical rubber article with a leak wherein the following formula (1) is satisfied:

$$\frac{\rho_G \cdot v_G \cdot V_{DM}}{D \cdot \gamma_{DM} \cdot \sqrt[3]{a}} \geq 10^{-5}, \quad (1)$$

which comprises the following parameters:
- $\rho_G$ is density of the transport gas at 20° C. [kg/m³];
- $v_G$ is flow speed of the gas or compressed-air quantity fed to the distributor device [m/s], measured in accordance with ASTM D3154-14;
- $V_{DM}$ is volume flow of the sealant quantity fed to the distributor device [m³/s], measured in accordance with ISO 1217, annex C;
- D is diameter of the feed openings [m];
- $\gamma_{DM}$ is surface tension of the sealant at 20° C. and normal pressure [kg/s²], measured in accordance with ASTM D1331-14 (method A); and,
- a is the number of feed openings.

16. The method as claimed in claim 15, wherein the pneumatic vehicle tire or the inflatable technical rubber article is not moved during step C) and in the time between steps B) and C).

17. The method as claimed in either of claim 15, wherein, in step B), an aerosol composed of sealant droplets and the gas is generated by feeding the sealant into the sealant transport channel by means of the metering unit.

18. The method as claimed in claim 17, wherein at least 50 wt % of the aerosol particles of the aerosol conducted in step B) into the pneumatic vehicle tire with a leak or into the inflatable technical rubber article with a leak have a particle diameter in the range from 1 μm to 100 μm.

19. The method as claimed in 15, wherein during step C):
- the sealing pressure in the pneumatic vehicle tire is at least partially in the range from 0.5 bar to 3 bar; and,
- the hydrodynamic pressure of the volume flow of the aerosol in the sealant transport channel is at least partially in the range from 0.2 bar to 8 bar.

* * * * *